United States Patent [19]

Yoshimura et al.

[11] 3,745,527
[45] July 10, 1973

[54] ELECTROOPTICAL DEVICE FOR DISCRIMINATING A PREDETERMINED PATTERN FROM OTHERS BY DETECTING PRESELECTED COLOR CHANGES IDENTIFYING THE PATTERN

[75] Inventors: Shoichiro Yoshimura; Rinzou Ebukuro; Tomoyuki Isono, all of Minato-ku, Tokyo, Japan

[73] Assignee: Nippon Electric Company, Limited, Tokyo, Japan

[22] Filed: Dec. 7, 1971

[21] Appl. No.: 205,666

[30] Foreign Application Priority Data
Dec. 9, 1970 Japan.............................. 45/108525

[52] U.S. Cl. 340/146.3 B, 235/61.11 E, 209/111.6, 356/178
[51] Int. Cl. ............................ G06r 7/00, G01j 3/34
[58] Field of Search............... 340/146.3 B, 146.3 Z, 340/146.3 K; 235/61.11 E, 61.11 F; 209/111.6, 111.5; 101/181, 184; 356/178

[56] References Cited
UNITED STATES PATENTS
3,617,704  11/1971  Kapsambelis et al. ........ 340/146.3 B
3,488,511   1/1970  Mori et al. ........................ 209/111.6

*Primary Examiner*—Thomas A. Robinson
*Attorney*—Richard C. Sughrue, J. Frank Osha et al.

[57] ABSTRACT

A pattern to be discriminated from other patterns comprises a frame of a predetermined size and color on a predetermined background color. The device comprises a first unit for producing electric signals responsive to the color change from the background color to the pattern color and the reversed color change and a second unit, responsive to these electric signals, for measuring the distance between the boundaries across which the color change takes place.

7 Claims, 11 Drawing Figures

PATENTED JUL 10 1973  3,745,527

ELECTROOPTICAL DEVICE FOR DISCRIMINATING A PREDETERMINED PATTERN FROM OTHERS BY DETECTING PRESELECTED COLOR CHANGES IDENTIFYING THE PATTERN

BACKGROUND OF THE INVENTION

This invention relates to an electrooptical device for discriminating a predetermined color pattern from other patterns by detecting color variations in the patterns. The device is useful in distinguishing between various postage stamps, bank notes, securities, and other such papers and in checking the aligning or register marks in multicolor printing.

Electrooptical recognition of a colored pattern has been applied to multicolor printing for checking the aligning marks. The recognition technique is based on the color contrast. More particularly, light from an incandescent lamp is focussed onto a spot where the aligning marks are caused to pass. The rays reflected from the paper on which the multicolor figure is printed is directed to a phototube or more generally to a photoelectric transducer. Inasmush as the output of the photoelectric transducer, which is responsive to the rays reflected from the colored portion, decreases in compliance with the spectral sensitivity, a decrease in the output below a predetermined level is understood to be recognition of an aligning mark. It is thus possible to detect the inadvertent omission of a color in the multicolor printing by the number of the recognized aligning marks without regard to recognition of the individual colors and to check the undesirable shear or out of register in printing by electrically measuring the distances between the aligning marks. This method is defective in that it is impossible to distinguish the aligning marks from an indent on the surface of the paper or a stain thereon of a color other than the predetermined colors.

The color contrast method may be used in a process of identifying predetermined color patterns on bank notes, securities, certificate stamps, and the like but is not immune from the above-mentioned defect which is inherent to the principles of this method.

The aligning marks are printed on a sheet of white paper. Besides their lengths, the characteristic features of aligning marks may include the following three items or attributes:

1. The color varies in the order of white — color — white;
2. The first white portion and the second white portion are spaced apart by the definite width; and
3. the color is predetermined.

The concept of these characteristic features is applicable to bank notes, securities, certificate stamps, and the like. It is, however, to be noted that contrary to the aligning marks which are color patterns of substantially uniform depth, it is difficult to establish the three items in the case of bank notes, securities, certificate stamps, and the like in that they have complicated patterns in various colors. If these latter mentioned papers are provided with a frame of a predetermined color, recognition thereof would be possible by means of the same items as the aligning marks. Even if provision of a color frame is impossible, recognition might be possible if attention could be directed to a particular color distribution in the pattern and to the similar items as those for the aligning marks. In this latter case, an item "The order of a color A - a color B - a color C" should be substituted for the item (1) "The order of white - color - white."

Among certificate stamps having the color frames are postage stamps. In automatic mail handling systems, the color frames are detected to aid in properly orienting the letters and postcards in the system, to aid in checking the postage, and placing postmarks across the stamps.

It is possible to discriminate postage stamps which are not subjected to special treatment but which are provided with patterns having frames printed in predetermined clearly distinguishable colors. The recognition is based only on the color and the dimensions of the frame printed on the postage stamps. Restrictions on the postage stamp design are such that the designed pattern should have a substantially rectangular frame of a clearly distinguishable and uniform color, having a predetermined length, width, and minimum predetermined thickness of, for example, 0.5 mm. Except for such restrictions, the color and the design of the postage stamps are free and subject to no further restrictions. However, it often occurs that the face of the mail bearing the stamp also bears an address, a message, and some printed letters and ornaments which happen to be quite similar to the predetermined color and dimensions of a postage stamp thus resulting in a possible misrecognition. With a conventional poastage stamp recognition device, high technical skill and a complicated control circuit are necessary to discriminate the postage stamps from various noises, such as the letters and the ornaments. One of such conventional recognition devices is described in Proceedings of the Institution of Mechanical Engineers, Volume 184 (1969-70), Part 3H, "British Postal Engineering," Paper 17 "Automatic Letter Facing."

SUMMARY OF THE INVENTION

It is, therefore, an object of the present invention to provide an electrooptical device for discriminating a predetermined color pattern from other patterns, the device being inexpensive and yet reliable.

It is another object to provide a device of the type which is insensitive to irregularities in the surface bearing the pattern to be discriminated.

It is still another object to provide a device of the type which is insensitive to noise signals caused by letters, ornaments, or other patterns. These patterns would result in a misrecognition if conventional devices were used It should be remembered that a pattern to be recognized by a device according to the instant invention is provided with a frame of predetermined dimensions and having at least one predetermined pattern color on a background of at least one predetermined background color, the background color generally being selected from the colors white, gray, and black.

A device according to this invention operates responsive to the color difference between one of the frame sides and the contiguous background. More particularly, the device discriminates the specific pattern to be recognized from other patterns by recognizing the differences or the distinction which is present between the predetermined colors across the boundary lines between the frame and the contiguous portions of the background and further recognizing that the distances between the boundary lines are substantially equal to the predetermined dimension of the pattern to be recognized. Accordingly, a device according to this invention comprises first means for producing color distinction electric signals responsive to the color distinction between the colors of the frame and the background and second means responsive to such electric signals for measuring the spatial distance between the lines across which the color distinction is present.

According to an aspect of the present invention, the above-mentioned first means comprises means for determining the width of a zone serving as a side of the frame or forming the margin surrounding the frame.

On the whole, a postage stamp is provided with a design of at least one color printed on a generally white background with a margin of at least about 1 mm left around the design. This same procedure applies to a postcard having a government-imprinted stamp, an envelope having a postage meter stamp or indicia, or a stamped envelope. The above-mentioned one aspect of this invention makes use of the fact that the margin is at least about 1 mm wide and the side of the color frame is at least about 0.5 mm thick although the particular measurements depend on the design. The first means may include means for producing an electric signal when a first zone of a first predetermined color and of at least a first predetermined width is contiguous to a second zone of a second predetermined color and of at least a second predetermined width.

In an embodiment of the present invention illustrated hereinbelow, the above-mentioned first means comprises first color signal means, which in turn comprises photoelectric means and a color detector and produces first color signals or color logical signals. The photoelectric means comprises filters responsive to a set of clearly distinguishable colors and photoelectric transducers. Preferably, the set of colors is such that the rays of the colors, when superimposed, would result in white rays. The first means further comprises second color signal means having integrator means and produces second color signal or color pulse trains. The first means still further comprises distinction signal means having gate means for producing the distinction signals.

DESCRIPTION OF THE PREFERRED EMBODIMENTS

Figure 1:
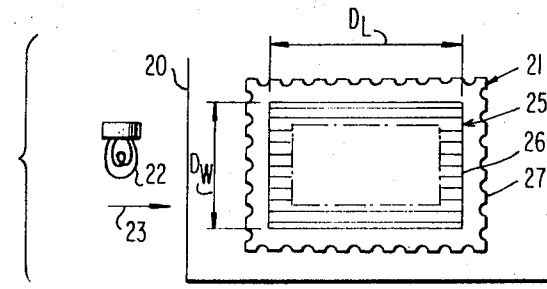
FIG. 1 is a plan view of an envelope having a postage stamp to be recognized by a device according to the present invention.

Referring to FIG. 1, letter mail and postcards, such as a mailed envelope 20, are fed one by one with a space (not shown) left between two consecutive pieces of mail in such a manner that a postage stape 21 attached thereto may be scanned by a white light beam projected thereon from a substantially point source 22 in the direction illustrated by arrow 23. The relative speed of scan is, for example, 2.8 m/sec. The postage stamp 21 is provided with a pattern 25 having a frame portion 26 of a predetermined pattern color printed on a predetermined background color with a margin 27 of about 1 mm around the pattern 25. The frame 26 is generally rectangular in outline and the sides are at least about 0.5 mm thick. The lengthwise distance $D_L$ between the lines bounding the frame is of a predetermined dimension, such as, for example, 22.5 mm. The envelope 20 may have letters 29 printed thereon line with the scan.

Figure 3:
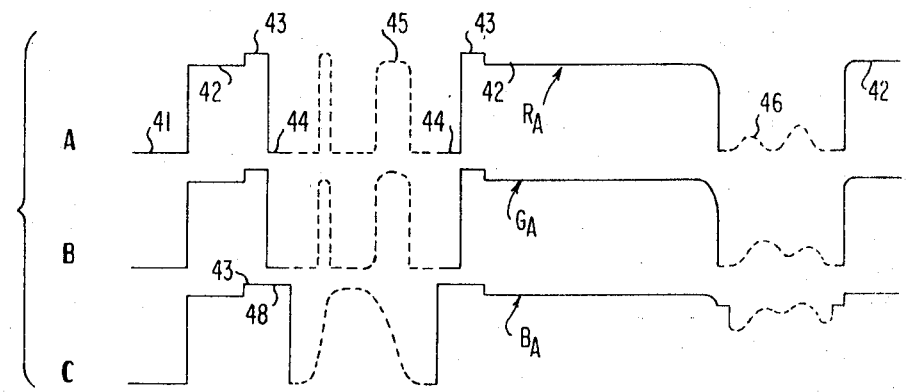
FIG. 3 shows the intensities of the respective components of three primary colors of the rays reflected from various points on the envelope depicted in FIG. 1.
Figure 6:
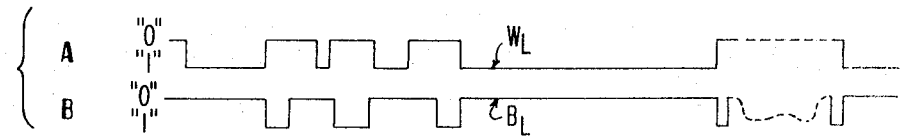
FIG. 6 shows logical electric signals produced by the color detector.
Figure 8:
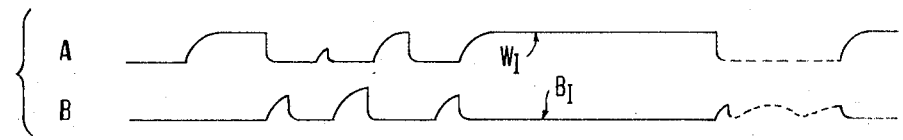
FIGS. 8 through 10 shows signal wave forms appearing in the frame detector.
Figure 9:
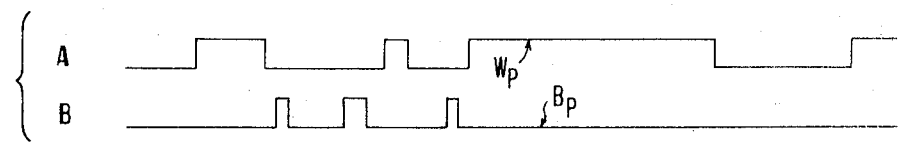
Figure 10:
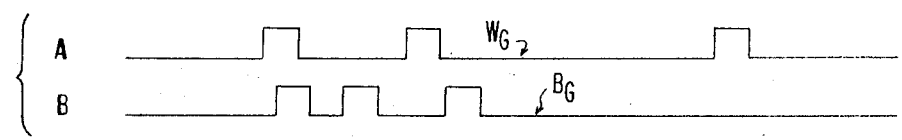
Figure 2:
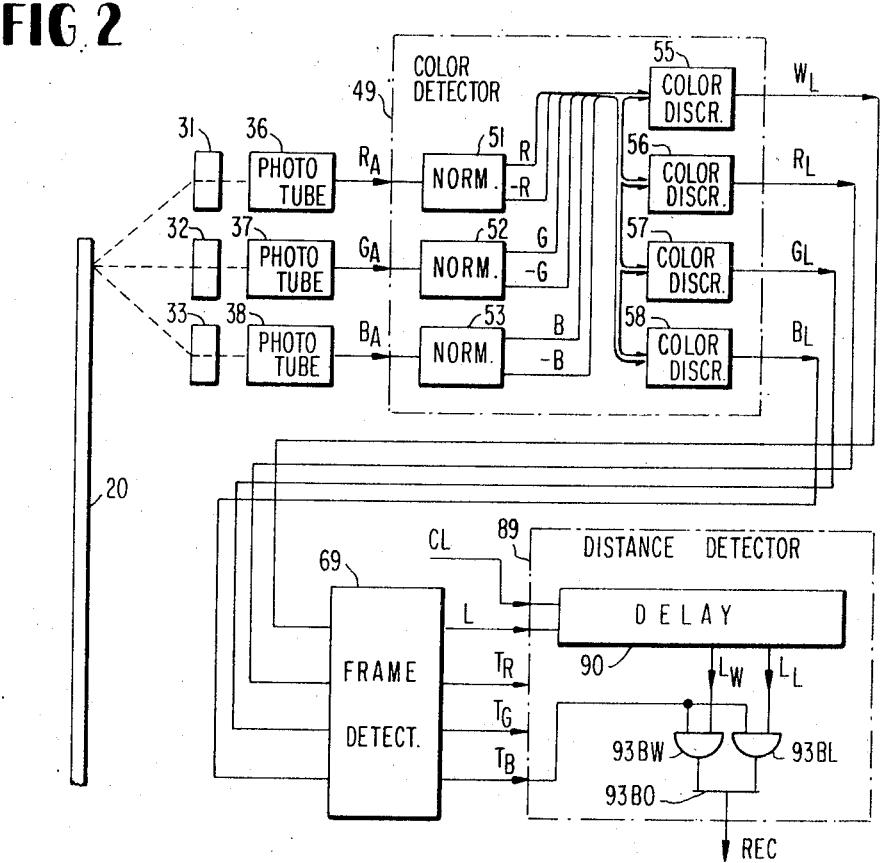
FIG. 2 is a block diagram of an embodiment of this invention.

Referring to FIGS. 1 through 3, it is assumed that substantial portions of the rays reflected from the margin 27 and the frame 26 pass through filters 31, 32 and 33 of three primary colors, such as red, green, and blue, respectively. The rays reflected from the postage stamp bearing surface of envelope 20 and the postage stamp 21 are received by three phototubes 36, 37, and 38 through the filters 31, 32, and 33 and an optical system (not shown) for directing preferably equally divided portions of the reflected rays to the filters 31, 32, and 33, respectively. The phototubes 36, 37, and 38 produce color analog electric signals $R_A$, $G_A$, and $B_A$ which are representative of the red, the green, and the blue components of the reflected rays, respectively, and vary as the envelope 20 with the postage stamp 21 is scanned by the white light beam. In FIG. 3A, the red analog signal $R_A$ successively assumes a first, minimum level 41 corresponding to the dark current of the phototube 36 until the light beam reaches the edge of the envelope 20, a second level 42 corresponding to the red component of the rays reflected from the face of the envelope 20, a third, maximum level 43 corresponding to the rays reflected from the white margin 27, a fourth level 44 substantially equal to the first level corresponding to the rays reflected from the blue frame 26, a fifth, varying level 45 responsive to the rays reflected from the inner portion of the pattern 25, again the fourth, the third, and the second levels 44, 43, and 42, a sixth, varying level 46 responsive to the rays reflected from the area bearing the letters 29, and again the second level 42 and the first level. In FIG. 3B, the green analog signal $G_A$ undergoes a change similar to the red signal $R_A$. As shown in FIG. 3C, the blue analog signal $B_A$ assumes a level 48 substantially equal to the maximum level 43 when the light beam relatively scans the blue frame 26.

Figure 4:
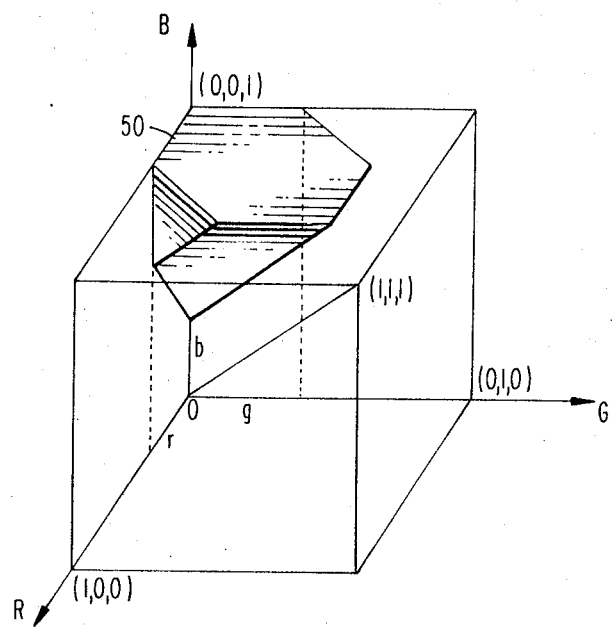
FIG. 4 shows a color solid for explaining a color detector used in the device illustrated in FIG. 2.

Referring to FIGS. 1 through 6, the color analog signals $R_A$, $G_A$, and $B_A$ are delivered to a color detector 49 which may be that disclosed in Japanese Patent Application No. Syo 45-37245 filed Apr. 30, 1970. According to the application, it is possible as shown in FIG. 4, to represent a given color by a point included in a unit color solid in a space having a set of coordinate axes representative of primary colors. The coordinate origin 0 and the opposing vertex (1, 1, 1) of the unit solid represent black and white, respectively. The diagonal passing through the origin 0 and the opposing vertex (1, 1, 1) is the axis of luminosity, while the saturation varies in the plane perpendicular to this diagonal. The color detector 49 recognizes as blue the colors represented by the points within a solid figure 50, that is, by the following inequalities:

$$-B + R + b < 0,$$
$$-B + G + b < 0,$$
$$-R + G + r > 0, \text{ and}$$
$$-G + R + g > 0,$$

where R, G, and B represent normalized red, green, and blue components of the color in question and $r$, $g$, and $b$ represent the respective red, green, and blue intercepts given by the surfaces of the solid figure 50 and consequently determine the allowance for the blue colors. As depicted in FIG. 2, the color detector 49 may include three normalizing units 51, 52, and 53. The red-signal normalizing unit 51 comprises a pair of d.c. amplifiers (not shown) for producing a pair of normalized red analog electric signals R and −R. Similarly, the green-signal normalizing unit 52 produces a pair of normalized green analog signals G and −G, while the blue-signal normalizing unit 53, a pair of normalized blue analog signals B and −B. The color detector 49 may further include a color discriminator 55 for white and three additional color discriminators 56, 57, and 58 for the respective ones of the primary colors. As exemplified in FIG. 5, the blue discriminator 58 comprises a plurality of adder/comparators 61, 62, 63, and 64. Supplied with the signals −B, R, and $b$, the first adder/comparator 63 derives the algebraic sum of the input signals and produces a first logical electric signal which become logical "0" and "1" according as the algebraic sum is positive and negative, respectively. The other adder/comparators 62 through 64 likewise produce similar logical electric signals, respectively. The logical signals are delivered to a four-input NAND circuit 65, with the logical signals produced by the third and the fourth adder/comparator 63 and 64 being inverted by inverter circuits 661 and 662, respectively. The allowance electric signals $r$, $g$, and $b$ are produced by adjustable potentiometers 67r, 67g, and 67b, respectively, symbolically depicted in FIG. 5. Although the same symbols R, G, B, $r$, $g$, and $b$ are used, it is believed that no confusion will arise between the geometrical or physical quantities and the analog electric signals representative thereof. It is now understood that the input logical signals of the four-input NAND circuit 65 is of logical "1" when the geometrical quantities R, G, B, $r$, $g$, and $b$ satisfies the inequalities given above. The blue logical electric signals $B_L$, derived from another inverter circuit 68 supplied with the output of the four-input NAND circuit 65, becomes a logical "1" or "0" in response to the rays reflected from the envelope 20 and the postage stamp 21 such that a logical "1" appears if a blue color, represented by a point within the solid FIG. 4 is detected and a logical "0" appears if a blue color is not detected. The red, the green, and the blue logical signals $R_L$, and $G_L$, and $B_L$ are similarly derived from the color discriminators 56, 57, and 58, respectively. The white color discriminator 55 recognizes the color in question to be white when the normalized color components R, G, and B are greater than preselected values $w_R$, $w_G$, and $w_B$, respectively. For simplicity, the preselected values may be equal to a single value $w$. In this simpler case, the white color discriminator 55 may comprise three adder/comparators (not shown) supplied with the sign-inverted normalized color analog signals −R, −G, and −B, respectively, and with an allowance electric signal $w$ in common. The outputs of the adder/comparators are supplied to a three-input NAND circuit (not shown) and then to an inverter circuit (not shown) to become the white logical signal $W_L$ which becomes logical "1" when the color to be recognized is within a small cube having each edge of the length equal to the difference $1 - w$ and similarly placed with respect to the unit color cube with the white vertex (1, 1, 1) in common. The white and the blue logical signals $W_L$ and $B_L$ become logical "1" as shown in FIGS. 6A and 6B while the white and the blue areas 27 and 26 are relatively scanned by the light beam, respectively. In FIGS. 6A and 6B, logical "1" and "0" are represented by the lower and the higher levels, respectively, for ease of description of the later stages of the embodiment of this invention being described.

The three primary colors may be magenta, yellow, and cyan. Alternatively, a pair of complementary colors may be used instead of a set of three primary colors. Contrarily, two sets or more of the primary and/or complementary colors may be used. In any event, it is preferable that one of the colors is the color of the substantial portion of the rays reflected from the frame 26. When the background color is clearly a distinguishable color other than white, the color components into which the reflected rays are separated by the filters, such as 31 and 32, may not be those which when added, result in white. In the above-referred patent application, the inequalities for a solid figure similar to FIG. 4 are:

$$R > G + a,$$
$$R > B + b, \text{ and}$$
$$|G - B| \leq c,$$

where symbols are similar to those used in the present application. As seen from this, it is possible to modify the color detector 49 in various ways.

Figure 7:
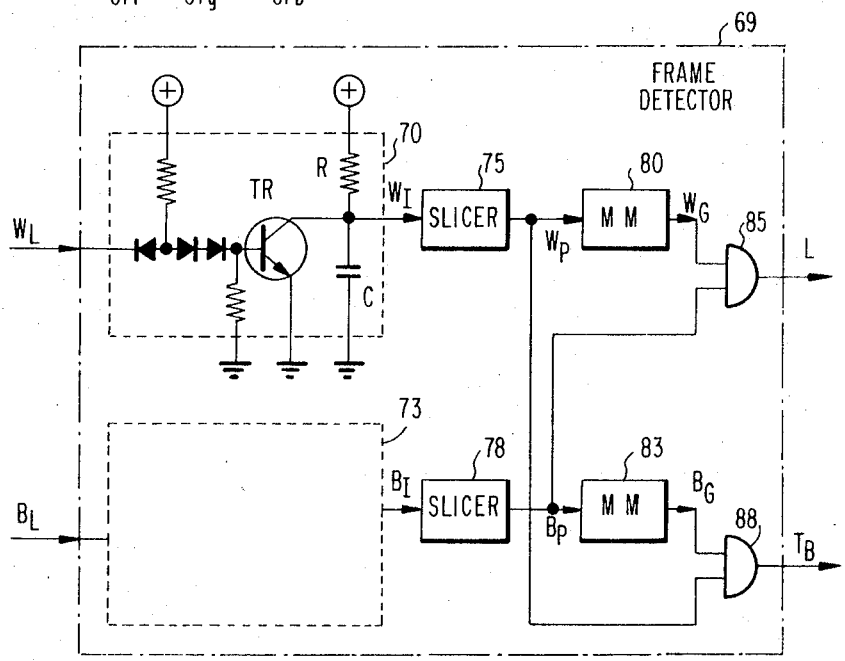
FIG. 7 illustrates the circuit, partly in blocks, of a portion of a frame detector used in the device depicted in FIG. 2.

Referring to FIGS. 1, 2 and 7 through 11, the color logical electric signals $W_L$, $R_L$, $G_L$, and $B_L$ are delivered to a frame detector 69 for detecting the color change at the leading and the trailing edges of the frame 26. As shown in FIG. 7, the pertinent portion of the frame detector 69 comprises a white and a blue integrator 70 and 73, each output of which builds up beyond a predetermined level towards saturation when the input signal assumes a predetermined level for a sufficiently long duration of time and rapidly drops as soon as the input signal assumes another predetermined level. Such an integrator 70 or 73 is called herein may comprise a capacitor C which is charged through a resistor R with a large time constant RC while the input logical signal is of logical "1" (low level) to keep a transistor TR shunting the capacitor C in the off state and is rapidly discharged through the transistor TR with a very small time constant $CR_{sat}$ as soon as the input signal become logical "0" (high level) to turn the transistor TR into the on state having a saturation resistance $R_{sat}$. The output integration signals $W_I$ and $B_I$ of the integrators 70 and 73 therefore vary in the manner depicted in FIGS. 8A and 8B, respectively. These output signals $W_I$ and $B_I$ are supplied to a white and a blue slicer 75 and 78 which produce trains of color pulses $W_P$ and $B_P$ shown in FIGS. 9A and 9B, respectively, when the time constant RC and the slice level for each color integration signal are selected in compliance with the predetermined least width for the color zone, such as the margin 27 and the frame 26. The pulse trains $W_P$ and $B_P$ are supplied to a white and a blue monostable multivibrator 80 and 83 connected to a leading and trailing edge AND circuit 85 and 88 for detecting the color change. Responsive to the trailing edge of each pulse of the white pulse train $W_P$, the white multivibrator 80 produces a white gate pulse $W_G$ shown in FIG. 10A of a predetermined width. Responsive to the trailing edge of each pulse of the blue pulse train $B_P$, the blue multivibrator 83 produces a blue gate pulse $B_G$ illustrated in FIG. 10B of predetermined width. The predetermined width is a little longer than the buildup time of the output signals of the integrators 70 and 73. Opened by the white gate pulse $W_G$ produced in response to the margin 27 leading the leading edge of the frame 26, the leading edge AND circuit 85 gates the blue pulse $B_P$ produced in compliance with the side of the frame 26 contiguous to the leading margin 27, to provide a leading edge pulse L shown in FIG. 11A representative of the color distinction present across the leading edge of the frame 26. Similarly, the trailing edge AND circuit 88 allows the white pulse $W_P$ for the trailing margin 27 to pass therethrough to become a blue trailing edge pulse $T_B$ shown in FIG. 11B representative of the color distinction present at the trailing edge of the frame 26. Preferably, the above-mentioned predetermined width should be about a half longer than the duration corresponding to the larger of the predetermined thickness of the side of the frame 26 and the predetermined width of the margin 27 so as to cover the fluctuation in the relative speed of scan, the expansion of the postage stamp 21 due to moisture, the slant positioning of the postage stamp 21, and the like.

Figure 11:
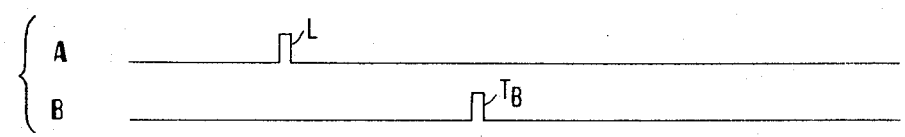
FIG. 11 shows edge pulses derived from the frame detector.
Figure 5:
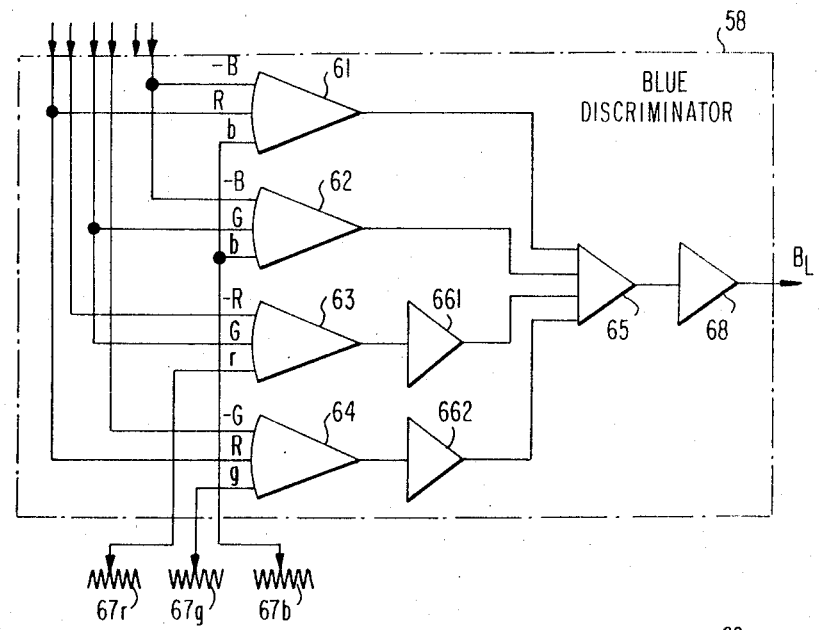
FIG. 5 is a block diagram of a portion of the color detector.

Referring to FIGS. 1, 2, and 11, the edge pulse L and $T_B$ are supplied to a distance detector 89 whose pertinent components are a delay circuit 90 for delaying the leading edge pulse L for the time corresponding to the lengthwise distance $D_L$ between the leading and the trailing edges of the frame 26 to produce a lengthwise delayed leading edge pulse $L_L$ and a blue length AND circuit 93BL supplied with the delayed pulse $L_L$ and the blue trailing edge pulse $T_B$ for producing a recognition signal REC through a blue recognition OR gate 93B0. The delay circuit 90 may be a shift register caused to step by a clock pulse train CL whose repetition frequency is determined in consideration of the distance to be detected, the relative speed of scan, the resolution, the stages of the shift registers, and others. With a shift register of sixty-four stages and for the example being described, the repetition frequency of 7.7 kHz provides a resolution of 0.37 mm with the delayed pulse $L_L$ taken out from the sixtieth stage. For the postage stamps transversely positioned on the envelope 20, the delay circuit 90 is provided with an intermediate output in compliance with the widthwise distance $D_W$ between the bounding lines of the frame 26 for producing a widthwise delayed leading edge pulse $L_W$, which is supplied to a blue width AND circuit 93BW together with the blue trailing edge pulse $T_B$ for producing the recognition signal REC through the OR gate 93B0.

While the present invention has thus far been described with particular reference to recognition of the postage stamps having a white background and a frame of a specific dimensions and of the color reflecting blue rays capable of passing through the blue filter 33, it is obvious to those skilled in the art that the system can be easily adapted to the recognition of color prints provided with a frame at at least one predetermined pattern color and of predetermined dimensions on a background having at least one predetermined background color, the color prints including the aligning marks.

What is claimed is:

1. A device for electrooptically discriminating a specific pattern from other patterns, said specific pattern including a frame of predetermined size and color on a background of another predetermined size and color on a background of another predetermined color, comprising:

first means for producing color distinction electric signals representative of the color distinction between said pattern frame and said background colors, and second means responsive to said electric signals for measuring the spatial distance between the locations of the said color distinctions, wherein said first means comprises:

means for scanning said patterns and background to produce color indicative rays, photoelectric means, responsive to the rays of a set of predetermined color components incident thereon, for producing color analog electric signals representative of the intensities of the rays of the respective ones of said color components, the substantial component of each of said pattern and said background colors being at least one of said color components, a color detector responsive to said color analog signals for producing color logical electric signals for the respective ones of said color components and for a combination of at least two of said color components, each said color logical signals assuming a predetermined level when the intensity of the rays of the concerned at least one of said color components incident on said photoelectric means is stronger than the intensity predetermined for each of the concerned ones of said color components, said color detector comprising potentiometer means for producing allowance electric signals determinative of the intensities predetermined for said color components and for said combination of at least two of said color components, and means responsive to said color logical signals produced in response to the rays incident on said photoelectric means from a zone of said pattern color and a contiguous zone of said background color for producing said color distinction signals.

2. A device as claimed in claim 1, wherein said color detector further comprising:

normalizing circuits responsive to said color analog signals for producing normalized color analog electric signals, respectively, and adder/comparator means responsive to said normalized color analog signals and said allowance signals for producing said color logical signals, each assuming said predetermined level when the algebraic sum of the concerned normalized color analog signals and the concerned allowance signal is negative.

3. A device for electrooptically recognizing a pattern including a frame provided with a zone of a predetermined pattern color and of at least a predetermined frame width on a background provided with a zone of a predetermined background color and of at least a predetermined background width, said background zone being contiguous to said frame zone, the bounding lines between the contiguous frame and background zones being spaced apart by a predetermined distance, comprising:

first means for relatively scanning a given pattern provided on a given background with a light beam, second means responsive to the light beam modified by that portion of said given pattern and background which is colored in each of said pattern and background colors for producing a first color electric signals of a duration proportional to the width of each of said portions, third means responsive to each said first color signals for producing second color electric signals when the duration of each said first color signal exceeds a predetermined duration, fourth means responsive to said second color signals for producing color distinction electric signals representative of the color change when a portion colored in one of said pattern and said background colors and another portion colored in the other of said pattern and said background colors are contiguously scanned, and fifth means responsive to said color distinction signals for measuring the spatial distance between the bounding lines across which the color of the contiguous portions vary from said background color to said pattern color and from said pattern color to said background color.

4. A device for electrooptically detecting a predetermined pattern from a plurality of patterns, said predetermined pattern being positioned on a background of predetermined background color, said predetermined pattern including a generally rectangular frame area of preselected size and color, at least two parallel sides of said frame being of a predetermined width and spaced from one another by a predetermined distance, said background including a margin zone extending outwardly from each of said at least two parallel sides at least a predetermined margin width comprising:

means for scanning said patterns and background to produce rays characteristic of the colors in said patterns and background, means responsive to said rays for producing a first critical boundary recognition signal when said rays indicate said background color extending over said margin width contiguous to said predetermined frame color extending over said predetermined side width, and a second critical boundary recognition signal when said rays indicate said predetermined frame color extending over said predetermined side width contiguous to said background color extending over said margin width, and means responsive to said critical boundary recognition signals for determining the spatial distance between the locations on the scanned background and patterns giving rise to said recognition signals.

5. A method for discriminating a predetermined pattern from a plurality of patterns situated on a background comprising:

a. providing said predetermined pattern with a frame area of preselected size and color, said frame including at least two parallel sides of predetermined width and spaced a predetermined distance from each other, b. preselecting the color of said background area, and providing said background area with a margin zone extending outwardly from said parallel sides a predetermined margin width, c. scanning the patterns and background to detect the colors therein and the width of the color areas, d. detecting the boundary lines between a first color area having a predetermined width and being of a color corresponding to either the preselected frame color or background color and a second color area having a predetermined width and being of a color corresponding to either the preselected frame color or background color while being of a color different from the color of said first area, and e. measuring the distance between said boundary lines.

6. A device for electrooptically discriminating a specific pattern from other patterns, said specific pattern including a frame of predetermined size and color on a background of another predetermined color, comprising:

first means for producing color distinction electric signals representative of the color distinction between said pattern frame and said background colors, and second means responsive to said electric signals for measuring the spacial distance between the locations of said color distinctions, said first means comprising:

means for scanning the patterns and background with a light source to produce color distinctive rays, first color signal means responsive to the rays of each of the pattern and background colors produced in response to the light rays, for producing first color electric signals representative of the width of each color zone scanned, second color signal means responsive to said first color signals for producing second color electric signals when each said width is at least a predetermined width, said second color signal means including integrator means responsive to each of said first color signals for producing an integration electric signal whose amplitude does not grow above a predetermined level when the width of the given zone represented by the supplied first color signal is smaller than a predetermined width and whose amplitude builds up beyond said predetermined level and then saturates when the width of the last mentioned given zone is at least said predetermined width, the amplitude of said integration signal rapidly falling to zero when the supplied first color signal disappears, and slicer means responsive to said integration signal for producing said color signals when the amplitude of said integration signal is larger than said predetermined level, and distinction signal means responsive to said second color signals for producing said color distinction signals when zones of predetermined colors are contiguous to each other.

7. A device for electrooptically discriminating a specific pattern from other patterns, said specific pattern being positioned on a background of a predetermined background color and having a frame of a predetermined frame color, said frame having an outline including a pair of substantially parallel sides spaced apart by a predetermined distance, said frame extending inwardly of said outline at least a predetermined frame width from each of said sides, said background having a pair of margin zones extending outwardly of said outline at least a predetermined margin width from said sides, respectively, comprising:

scanning means for relatively scanning said patterns and background substantially perpendicular to said sides at a predetermined rate to produce rays characteristic of the colors in said patterns and background and of the widths of said frame and said margin zones, first means responsive to said rays for producing a first and a second color distinction signal when said scanning means relatively scans a first zone of said predetermined background color having at least said margin width and then a second zone of said predetermined frame color having at least said frame width and when said scanning means scans a third zone of said frame color having at least said frame width immediately followed by a fourth zone of said background color having at least said margin width, respectively, and second means responsive to said first and second color distinctive electric signals for producing a recognition signal discriminative of said specific pattern when said first means produces said first and second color distinctive electric signals with an interval corresponding to said distance.

* * * * *

UNITED STATES PATENT OFFICE
CERTIFICATE OF CORRECTION

Patent No. 3,745,527        Dated July 10, 1973

Inventor(s) Shoichiro YOSHIMURA et al

It is certified that error appears in the above-identified patent and that said Letters Patent are hereby corrected as shown below:

Column 1, line 51 - Before "definite" delete "the" and substitute -- a --

Column 2, line 2 - After "having" delete "the"

Column 5, lines 32 and 33 - Delete "comparator 63" and substitute -- comparator 61 --

Column 6, line 33 - After "which" insert -- , -- line 40 - Delete $|G \ B| \leq c$ and substitute -- $|G - B| \leq c$ -- line 56 - Delete "is called" and substitute -- as called -- line 62 - Delete "become" and substitute -- becomes --

Signed and sealed this 20th day of August 1974.

(SEAL)
Attest:

McCOY M. GIBSON, JR.        C. MARSHALL DANN
Attesting Officer            Commissioner of Patents